US007380730B2

(12) United States Patent
Bertoni

(10) Patent No.: US 7,380,730 B2
(45) Date of Patent: Jun. 3, 2008

(54) TUNNEL SPRAYER FOR ROWS OF PLANTS

(75) Inventor: Sergio Bertoni, Castel Bolognese (IT)

(73) Assignee: Bertoni S.r.l. (IT)

( * ) Notice: Subject to any disclaimer, the term of this patent is extended or adjusted under 35 U.S.C. 154(b) by 0 days.

(21) Appl. No.: 11/554,618

(22) Filed: Oct. 31, 2006

(65) Prior Publication Data
US 2007/0099495 A1    May 3, 2007

(30) Foreign Application Priority Data
Nov. 3, 2005    (IT)    ......................... BO20050067 U

(51) Int. Cl.
*B05B 9/06*    (2006.01)
(52) U.S. Cl. .................. 239/77; 239/104; 239/105; 239/172; 239/288; 239/288.5; 239/423; 239/548; 47/1.7
(58) Field of Classification Search ................ 239/77, 239/172, 288–288.5, 423, 424, 548
See application file for complete search history.

(56) References Cited
U.S. PATENT DOCUMENTS
2,714,527 A * 8/1955 Thompson ................ 239/77
5,228,621 A * 7/1993 Wilson et al. ............. 239/172
5,655,712 A * 8/1997 Jones ..................... 239/288.5
6,334,578 B1 * 1/2002 House ........................ 239/77

FOREIGN PATENT DOCUMENTS
EP    1 449 433    8/2004

* cited by examiner

*Primary Examiner*—Steven J Ganey
(74) *Attorney, Agent, or Firm*—Stites & Harbison PLLC; Marvin Petry

(57) ABSTRACT

Tunnel sprayer for rows of plants, is of the type having opposing shields (S, S') which substantially cover the whole heights of the opposing sides of at least one row, and which comprise fans (14) to create a flow of air which in delivery travels parallel to the flow of treatment liquid sprayed on to each side of the row by at least one corresponding bar (22) with nozzles (122) and which in intake sucks in the air and treatment liquid delivered by the shield operating on the other side of the row, so as to avoid the dispersion due to wind drift and limit losses in the air and drips of excess liquid on to the ground. In each shield (S, S') the area of the mouth or mouths (18, 19) for the delivery of the pressurized fluid is suitably smaller than the sum of the area of the apertures (13) occupied by the fans (14), in such a way that the said delivery mouth or mouths give out corresponding air flows whose flow rates and pressures are uniformly distributed and substantially constant over the whole height of this delivery mouth or these delivery mouths.

19 Claims, 12 Drawing Sheets

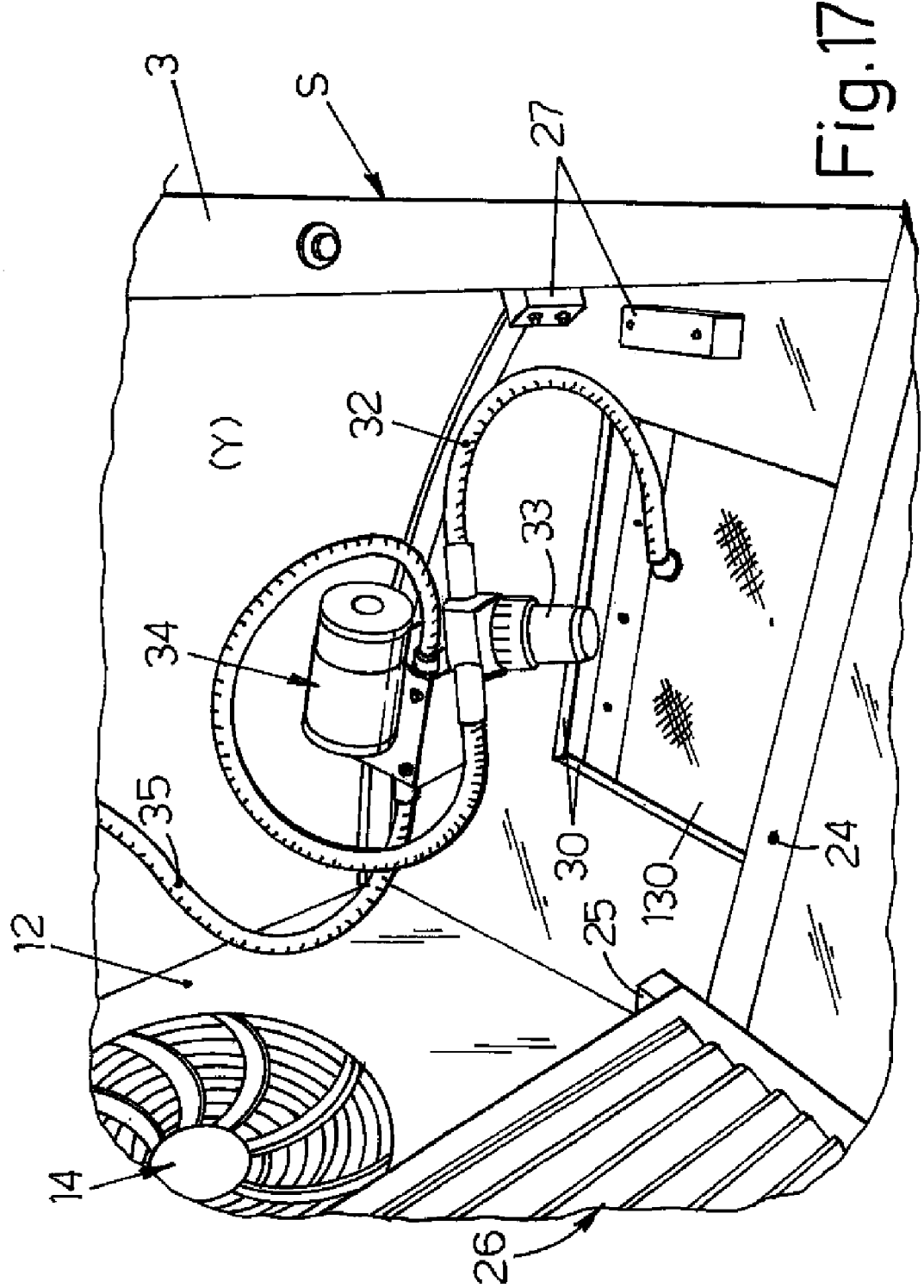

TUNNEL SPRAYER FOR ROWS OF PLANTS

DESCRIPTION

The invention relates to the tunnel sprayer for rows of plants described in European patent EP 1 449 433 B1 of the type comprising, on the uprights of a portal which is made to travel over the row, opposing vertical shields or screens which have the same height as the row to be treated and each of which is provided with at least one vertical spray bar which operates on the discharge outlet, also vertical, of a chamber which supplies a flow of pressurized air in parallel with the jets of treatment liquid supplied by the nozzles of the said bar, each shield also being provided, laterally and parallel to this chamber, with a vertical suction chamber having a large vertical mouth facing the row and communicating with the said delivery chamber via a plurality of axial fans, the two shields being located on the two sides of the row and being positioned with the said air flow delivery and intake mouths in opposing and inverted positions, so that the air and liquid delivery chamber of one shield is opposed to the intake chamber of the opposing shield, and vice versa. This opposing and staggered arrangement of the air flows improves the penetration of the treatment liquid into the depth of the row, provides uniform wetting of the plants in the row, and enables the treatment liquid mist to be recovered, so as to limit the dispersion of this liquid in the air and to the ground, with all the consequent advantages in economic and environmental terms. The invention relates to constructional and functional improvements to this type of machine, to enable it to achieve the desired results and to operate in a reliable way. The characteristics of these improvements are specified in the attached claims and will now be detailed in the following description which refers to the attached sheets of drawings, in which:

FIGS. 16 and 17 are enlarged views of further details of the components which operate in the intake chamber of each shield, particularly those of the fans and of the recovered liquid recycling pump.

Figure 1:
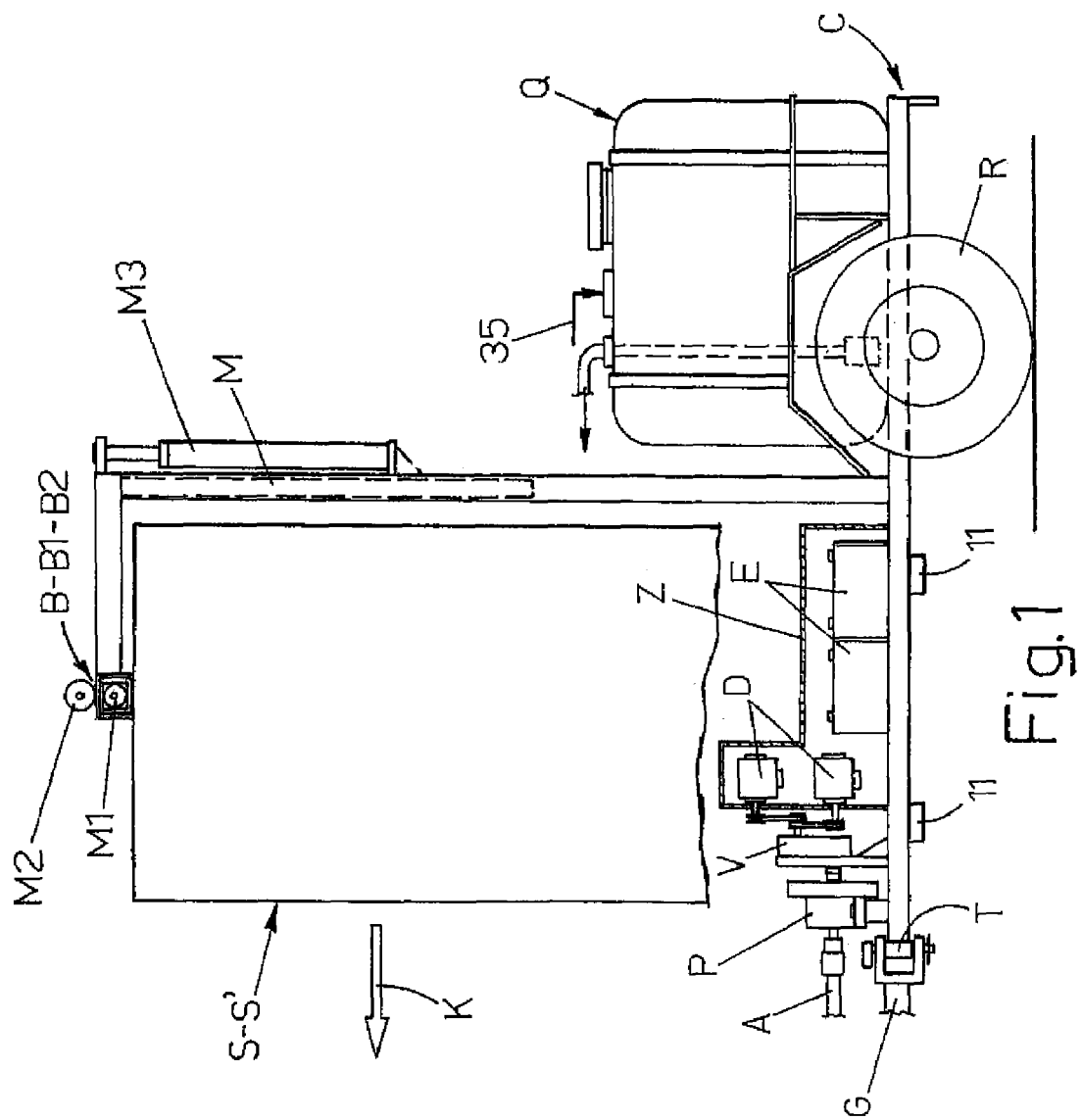
FIG. 1 is a schematic side elevation of the machine in the version towed by a tractor.
Figure 2:
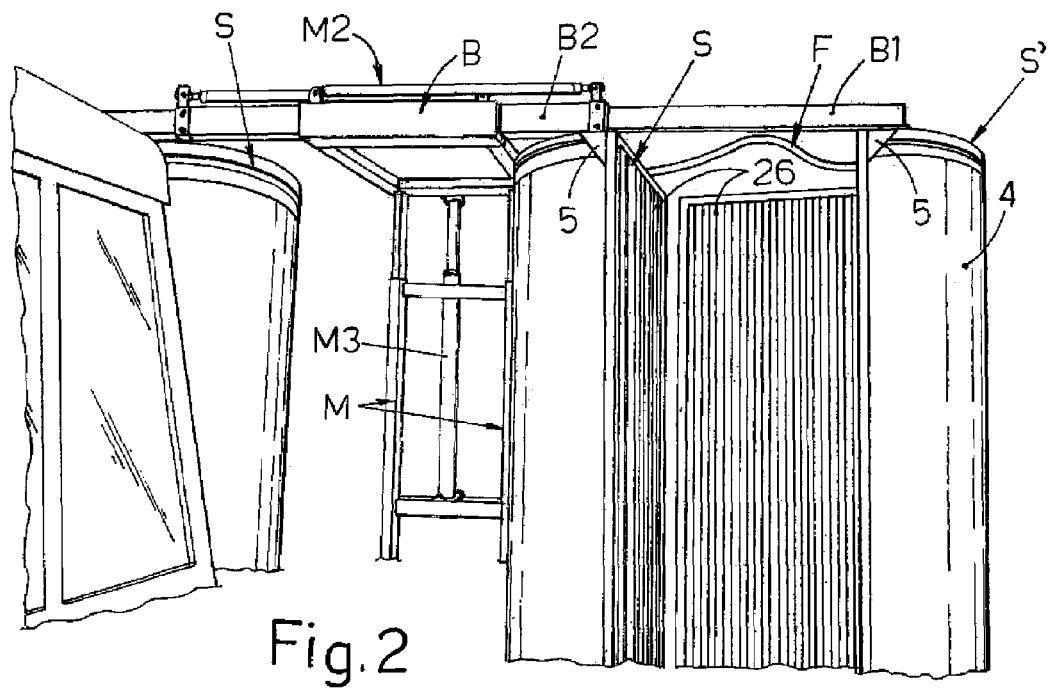
FIG. 2 shows the machine from the front, on one side, with a pair of shields open and with one of these in the air chamber maintenance condition.

In the prior art cited in the introduction to the present description, the portal structure with the opposing shields which are positioned and made to advance on opposite sides of the row was located in the rear part of a trailer towed by a tractor, which carried the treatment liquid reservoir and all necessary equipment for the operation of the machine, including the hydraulic power unit for actuating the corresponding hydraulic motors for rotating the axial fans which produce the delivery and intake air flows required for the operation of the machine. This solution with the shields located behind the wheels of the towed trailer caused major difficulties in the manoeuvring of the machine when moving into and out of the rows of plants. In the same prior art, the fans were driven by hydraulic motors which proved inadequate because they required the use of a high-power tractor for operating the machine's hydraulic power unit, and therefore, if the seals or the corresponding supply circuit ruptured, could cause leakage of oil which was carried by the pressurized air and dispersed on to the plants, damaging them irreparably. As shown in FIG. 1 and FIG. 2, these initial drawbacks have been overcome by mounting the shields S in the front part, closest to the wheels R of one or more parallel axles of a trailer C provided at the front with a shaft T for fixing to the tow hook G of a tractor, this shaft having steering properties if necessary, so that the said wheels R are located immediately behind the said shields. This solution enables the machine to be maneuvered easily when it is brought into or out of the rows, and brings the shields S into a position nearer the tractor and therefore more visible to the driver. The reservoir Q of plant treatment liquid is mounted in the rear part of the trailer C. The letter M indicates a telescopic vertical elevator whose movable upper part can be raised and lowered by the appropriate actuator M3 and extends towards the shields S to support transversely and in a projecting way the set B of telescopic arms with their actuating jacks (see below), which support the shields S, S' as stated below, to position the latter correctly on the opposite sides of the row. The machine can be set up to operate on only one row at a time, with a single pair of shields S, S' positioned so that they project from one side of the trailer C, or can advantageously be of the type shown in FIG. 2, with two pairs of shields, one pair being positioned on each side of the trailer C, to operate simultaneously on two parallel and adjacent rows of plants. The small number of hydraulic cylinders of the aforesaid units B and M can be actuated by the power unit incorporated in the towing tractor of the machine, which in this case can be low-powered and therefore small, facilitating maneuvering at the ends of the rows, especially since the tractor does not have to operate an auxiliary hydraulic power unit. The axial fans located in the shields S (see below) are designed in this case for electrical operation, and the means described below with reference to FIG. 1 and FIGS. 9 to 11 are mounted on the trailer C for this purpose. The high-pressure hydraulic pump P, which draws the treatment liquid from the reservoir Q, supplies it at the correct pressure to the aforesaid spray bars, and is driven by a universal coupling shaft A rotated by the tractor power take-off, is mounted on the front part of the trailer C. A step-up gear V, which is fixed by brackets to the trailer C, and which, by means of another joint or a suitable transmission, drives one or more alternators D protected inside a suitable container Z fixed to the trailer and designed to contain additionally a sufficient number of electrical accumulators, is connected by a suitable joint to the other end of the shaft of the pump P. If desired, the hydraulic cylinders of the upper unit B for positioning the shields S and the actuator M3 of FIG. 1 can be replaced by electrically operated linear actuators, so as to eliminate all hydraulic drive systems from the machine, with all the advantages, including environmental advantages, that are obtained thereby.

Figure 3:
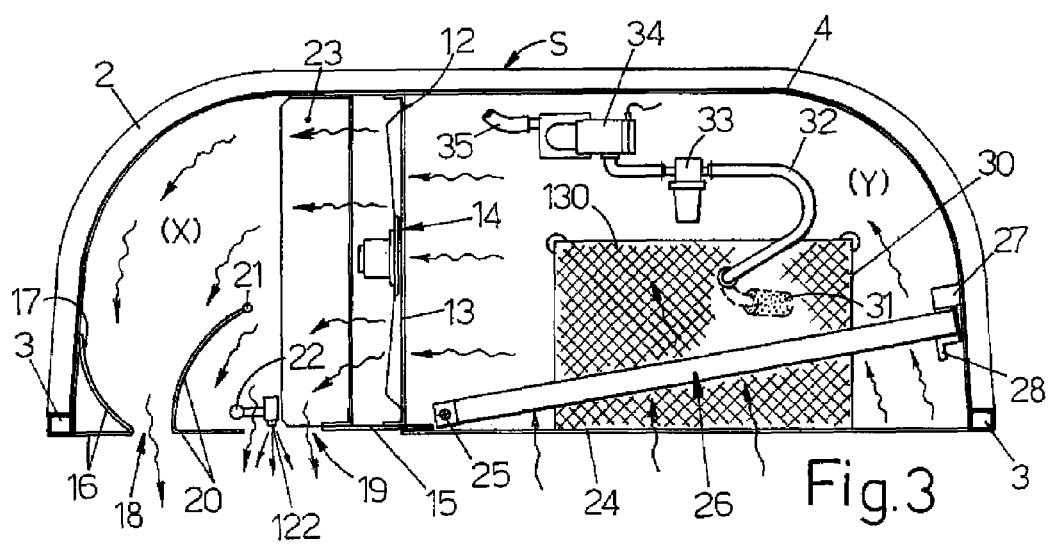
FIG. 3 is a plan view from above, in partial section, of one of the machine shields which operate on opposite sides of the row.
Figure 4:
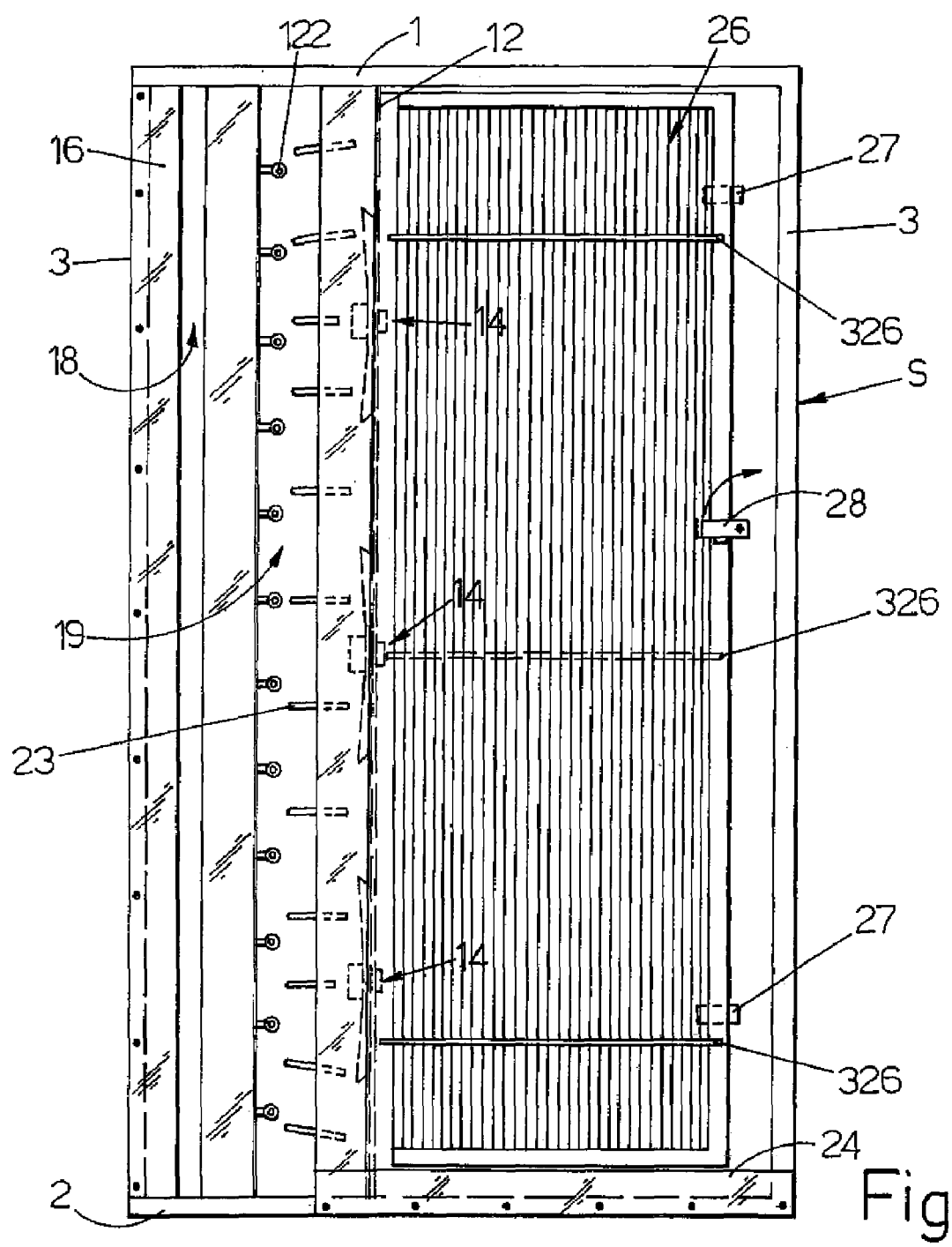
FIG. 4 is a side elevation of one of the shields shown in FIG. 2, viewed from the inner side which faces the row.
Figure 5:
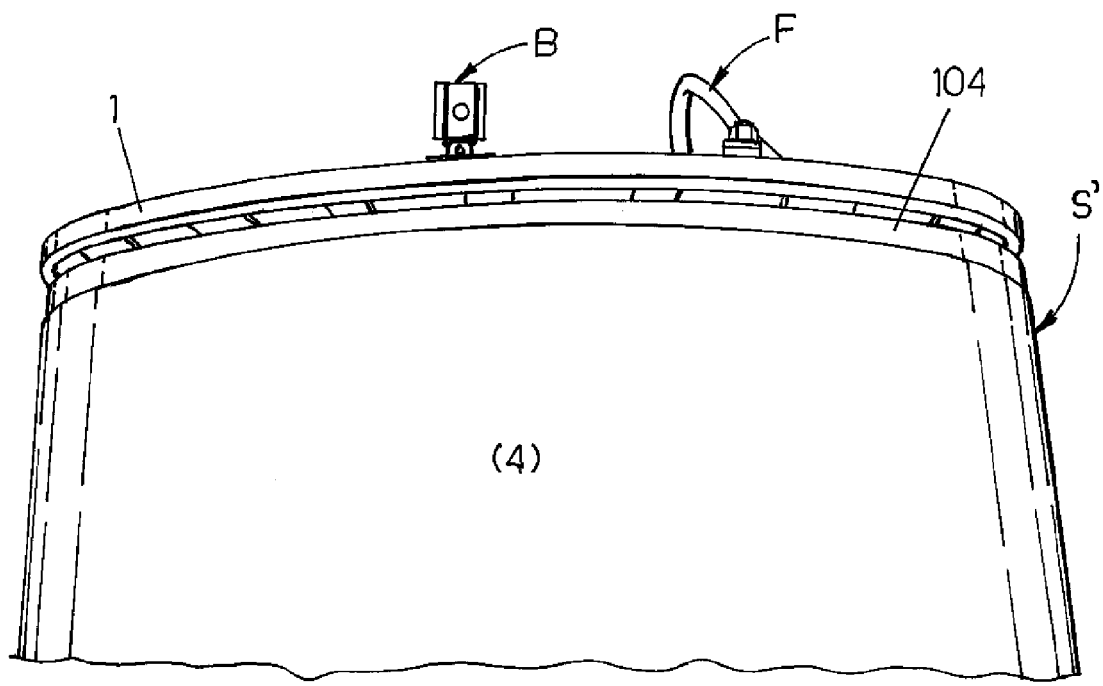
FIGS. 5 and 6 are perspective views from outside of the upper and lower ends of a shield respectively.
Figure 6:
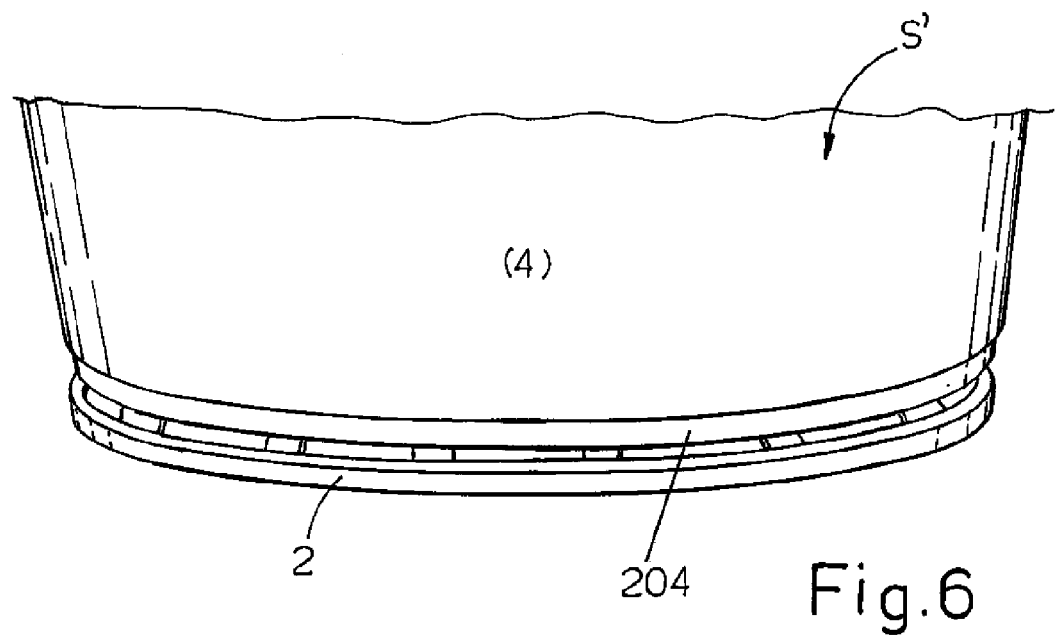

With reference to Figures and FIGS. 3 to 6, it will be seen that the shields S, S' are made with self-supporting characteristics and comprise corresponding lower and upper base frames 1 and 2 made from suitable tubular steel sections, having a shape in plan view substantially in the form of an elongate semi-circle, and fixed together by the ends of the straight sides by a pair of uprights 3, also made from suitable tubular steel sections, with corner reinforcements 5, and also fixed together by other parts described below. The U-shaped edges of shells 4 made from a suitable strong and light-weight plastics material, ABS for example, are fixed to the uprights 3, and are also fixed to the straight sides and to suitable cross-pieces of the bases 1 and 2, these shells being provided with suitable transverse reinforcing ribs both at the ends, as indicated by 104 and 204 in FIGS. 5 and 6, and in the intermediate parts as indicated by 304 in FIG. 14. FIGS. 5 and 6 show how the curved sides of the base frames 1 and 2 project slightly from the general boundary in plan view of the shields 4, so as to act as bumpers.

Figure 7:
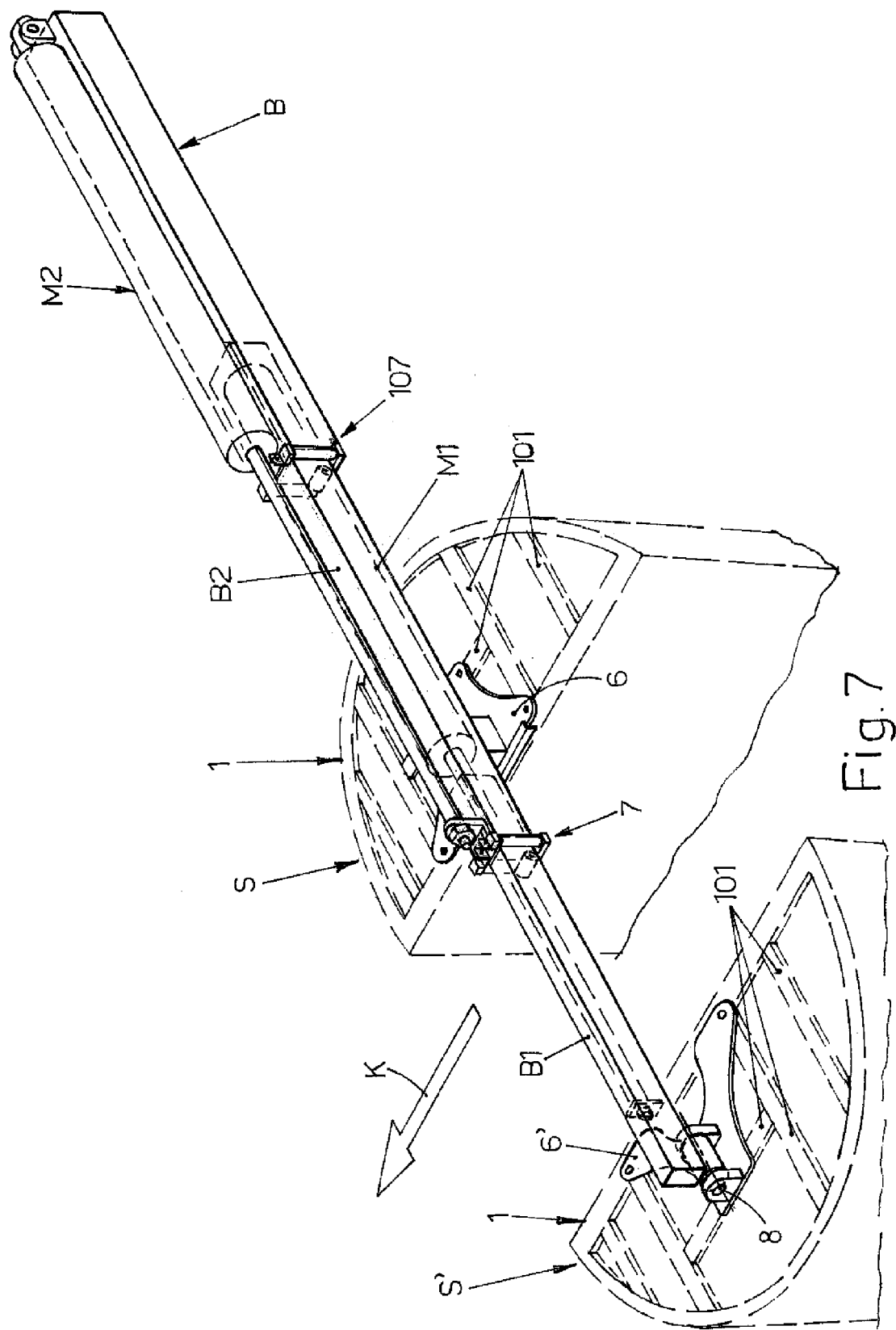
FIG. 7 is a perspective view of one of the telescopic arms which support a pair of shields of the machine.
Figure 8:
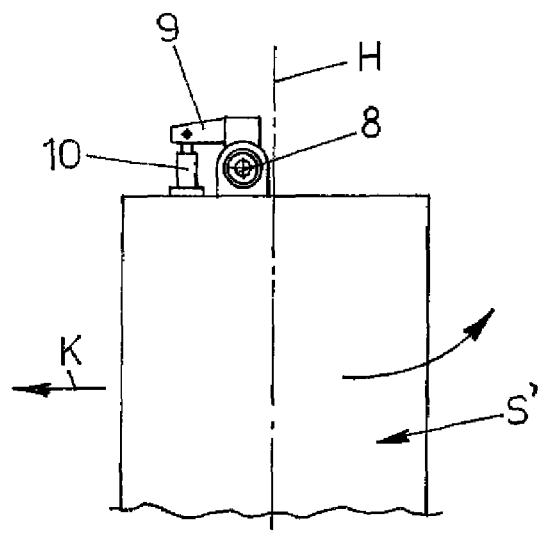
FIG. 8 is a schematic elevation taken from the outer side which lies outside the shields shown in FIG. 7.
Figure 9:
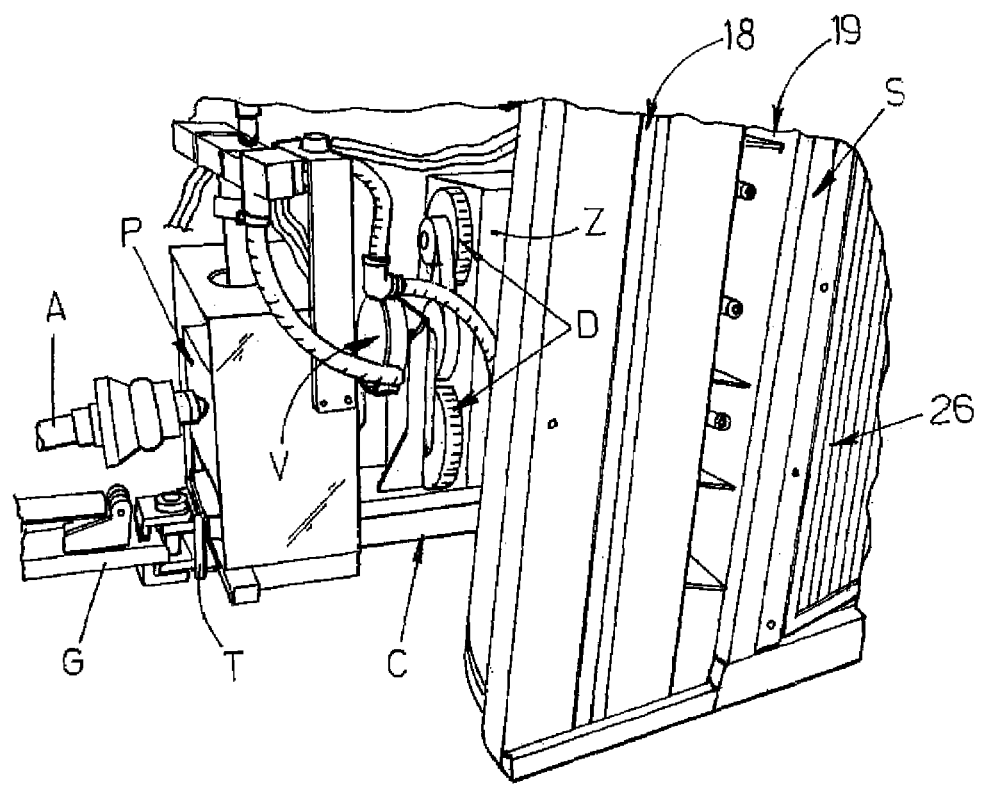
FIGS. 9, 10 and 11 are perspective views, taken at different angles, of the front part of the machine, with the pump which supplies the treatment liquid to the plants, with the generator or generators and with the electrical accumulators which supply the power at least for the operation of the motors for the axial fans of the shields.

FIG. 7 shows how the upper bases 1 of the self-supporting shields S, S', made as described above, are provided with suitable reinforcing cross-pieces 101 which are fixed to the three-point securing brackets 6, 6' mounted on the ends of corresponding arms B1 and B2 which can slide telescopically into each other and into a fixed section of the arm B fixed to the elevator unit M shown in FIG. 1. M2 indicates the external jack which actuates the arm B2 and M1 indicates the internal jack which actuates the arm B1. On the outer end of the arm B2 and on that of the fixed section B there are mounted sliding means 7, 107, which preferably also comprise idle rollers, including for example at least lower and lateral rollers, to facilitate the sliding of the movable arms B1, B2 which with the passage of time tend to become soiled with the treatment material sprayed by the machine in question. The inner shield S which is more visible to the driver of the tractor and is therefore easier to position with respect to the row, has its bracket 6 fixed directly to the arm B2. The outer shield S', as also shown in FIG. 8, which is more likely to encounter obstacles in the row which are not immediately visible to the operator, has its upper bracket 6' fixed to the support arm B1 by means of a cylindrical hinge 8, with an axis parallel to the longitudinal axis of the arm B1, and this shield is fixed to the support arm in such a way that its vertical median axis H is behind the said hinge 8, in such a way that, owing to the greater weight applied to this hinge, the shield tends to swing in the direction of advance K of the machine, while this shield is held correctly in the vertical position by its upper base 1 which bears on a stop member 9 fixed to the arm B1. This interaction can be achieved by interposing a damper 10 which extends in a substantially unrestricted way if the shield S' encounters an obstacle which makes it rotate in the anti-clockwise direction according to the view in FIG. 8, but which can suitably retard the swing in the opposite, clockwise direction, by which the shield returns under the effect of gravity to the vertical position when it clears the obstacle.

Figure 10:
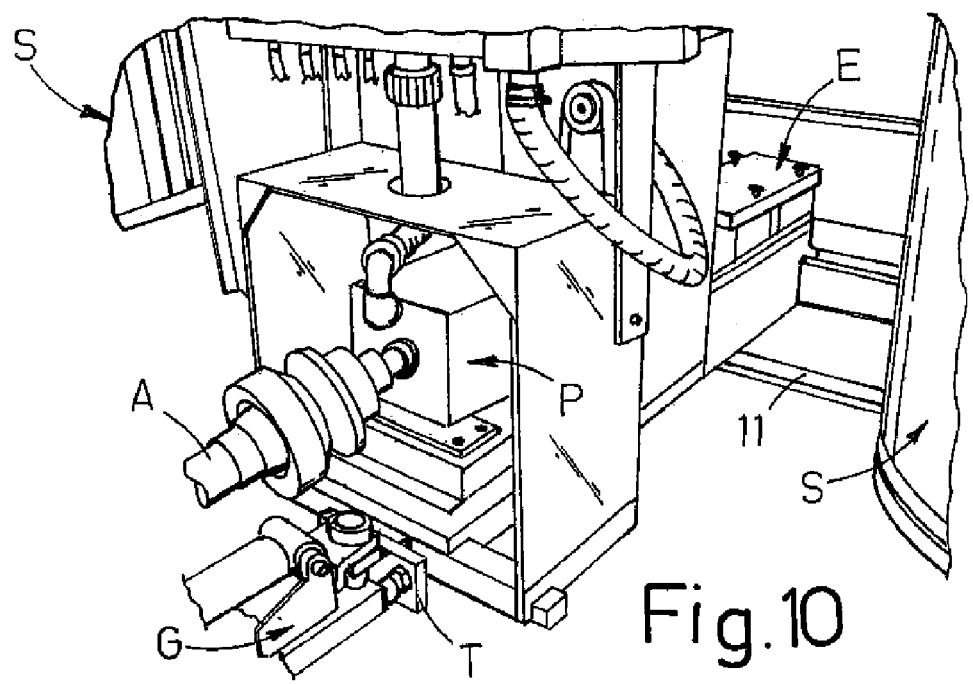
Figure 11:
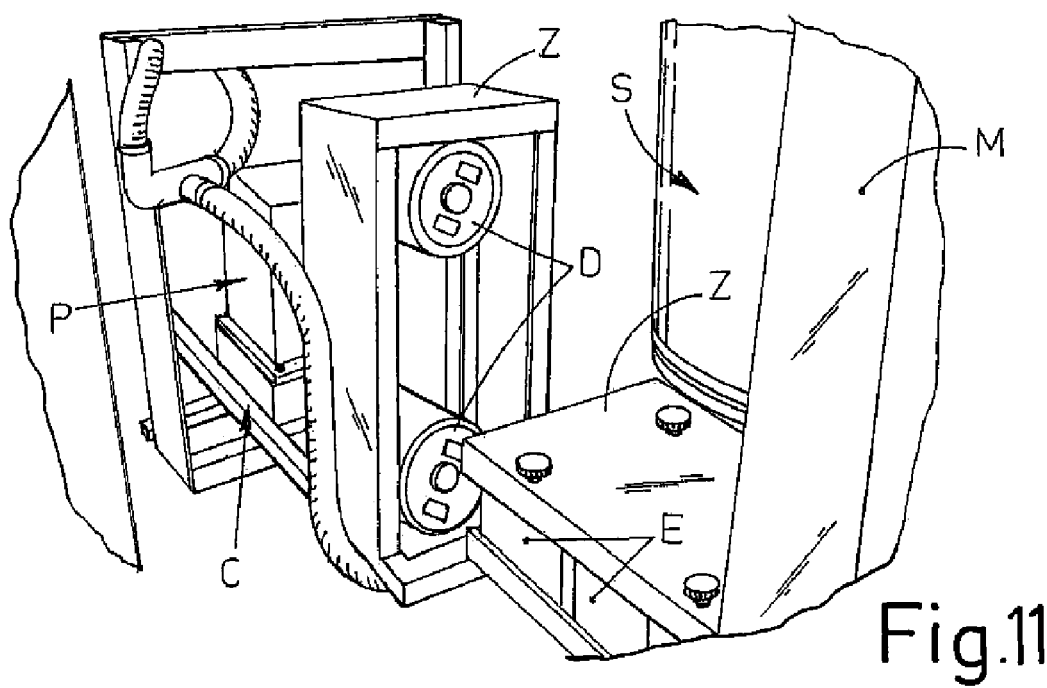

To limit the rocking movements of the shields S, S' when the machine is in transit with the shields lowered and retracted, the lower bases 2 of at least the shields S closer to the trailer C can be structurally connected to the trailer by at least one corresponding telescopic or pantograph connection, shown partially and indicated by 11 in FIG. 10.

Purely by way of example and without restrictive intent, good results have been achieved in the treatment of rows of grapes or other plants of average height above the ground by using shields S, S' with a length of approximately 1250 mm, a depth of approximately 450 mm in the intermediate area and a height of approximately 2150 mm.

Figure 16:
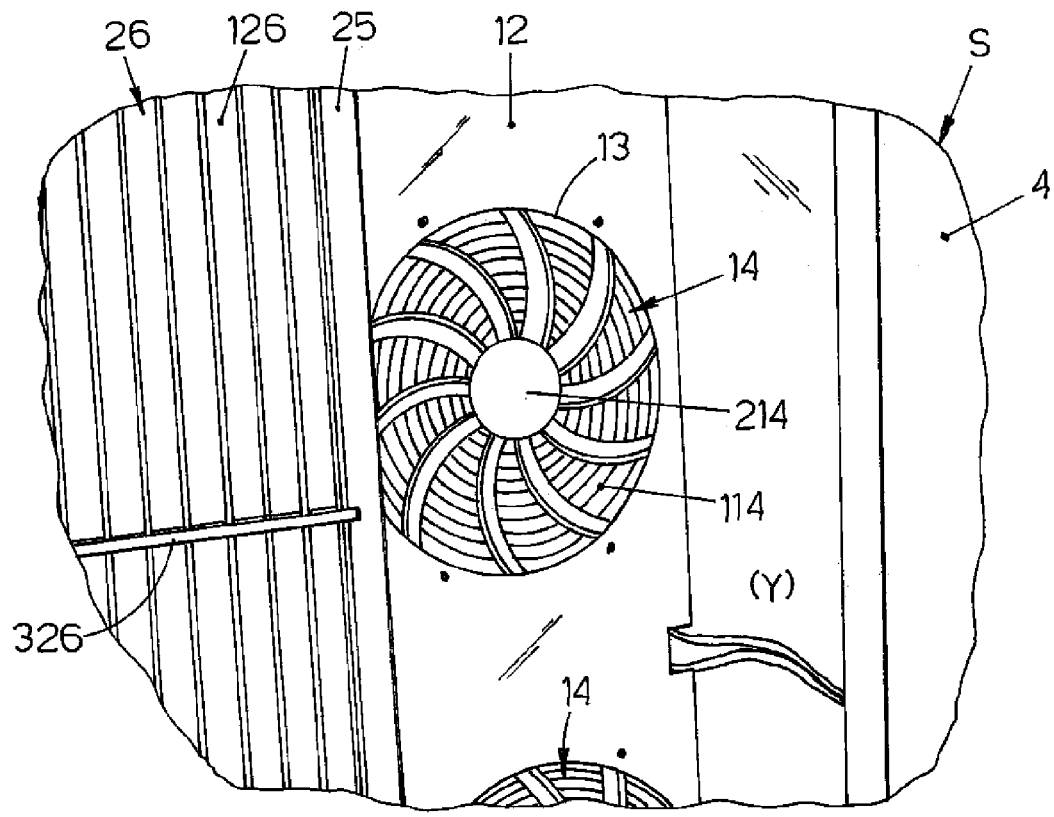

FIGS. 3 and 4 and FIGS. 12 to 14 show how a wall 12 is fixed transversely and over the whole height in the intermediate part of each shell 4, dividing the inner space of the shell into two adjacent chambers X and Y having different horizontal extensions or lengths, the chamber X having a length equal to or slightly less than about ⅓ of the total length of the shield and being used as the fluid delivery chamber, while the longer chamber Y is used as the intake chamber. On the said wall 12 there are formed, at equal distances from each other and from the lower and upper edges of each shell, three round apertures 13 with a diameter of about 400 mm, to the edge of each of which is fixed the stator ring of a corresponding electrically operated axial fan 14, these fans being for example of the type used for cooling heat exchange radiators, whose electric motors are sealed and are preferably located in the delivery chamber X, so as to be protected behind the solid central part 214 of the corresponding impeller (FIGS. 16 and 17). The motors of the fans 14 are supplied by the electrical circuit which comprises the alternator or alternators D and the accumulators E of FIG. 1.

A small wall 15, which extends over the whole height of the chamber X to close off part of the inner side of the chamber facing the row, and which has a horizontal extension or length of approximately 100 mm, is fixed to the straight sides of the bases 1 and 2 and to the adjacent vertical side of the dividing wall 12. The other end of the said inner side of the chamber X is closed off over a horizontal extension of approximately 100 mm by the straight wall of a V-section 16, fixed with this wall to the adjacent upright 3 and fixed by the end of its other curved wall to the inner wall of the shell 4, as indicated by 17. The opening of the inner side of the chamber X, lying between the section 16 and the wall 15, is divided horizontally into two parts or mouths 18 and 19 by a further vertical section 20, which also has a substantially V-shaped profile and has one straight wall coplanar with the wall 15 and fixed like the latter to the straight sides of the base frames 1 and 2, and which has a curved wall positioned inside the chamber X in a position which substantially mirrors that of the curved wall of the section 16, this wall being fixed, for example, to a rod 21 whose ends are fixed to the base frames 1 and 2. The flow of pressurized air produced by the fans 14 which draw air from the chamber Y is divided into two parts in chamber X by the curved wall of the section 20 which enters the chamber X to a depth of approximately 160 mm for example, and is thus partially directed to the mouth 18 and partially to the mouth 19. Because of the curvature of the inner wall of the shell 4 and the presence of the curved connecting wall of the section 16 on the final part of the inner wall, the air flow leaving the mouth 18 forms an angle with the inner side of the shell S which is presumably less than 90°, and is directed back towards the inside of the shield. Good results have been achieved by designing the mouths 18 and 19 with horizontal apertures of approximately 60 mm and approximately 100 mm respectively, so that the air emerges at higher pressure from the outer mouth 18. The sum of the areas of the mouths 18 and 19 is less than the sum of the areas of the apertures 13 in which the fans 14 operate, and therefore the flow of air drawn in by these components is compressed in the delivery chamber X and leaves the mouths 18 and 19 with characteristics of pressure and flow rate which are substantially constant and are uniformly distributed over the whole height of these mouths.

At the side of the mouth 19 which is formed by the section 20, there is a vertical bar 22, which is connected to the pump P for delivering the plant treatment liquid, and which in the present example is provided with twelve nozzles 122 spaced at equal intervals and distributed vertically, which spray the liquid perpendicularly and uniformly over the whole height of the row. The pressurized flat air stream leaving the inner mouth 19 accompanies the jets of liquid supplied by the said nozzles 122 in a parallel way and contributes to the uniform and penetrating distribution of the liquid among the plants of the row. The pressurized flat air stream leaving the outer mouth 18 retains on the side of the shield the treatment flow leaving the inner mouth 19, eliminates any drift phenomena caused by the wind, and because of its possible re-entrant inclination and its higher pressure, promotes the formation of a vortex which improves the quality of the wetting of the plants of the row by the nozzles 122.

In order to create a uniform vertical distribution of the pressurized air flows produced by the fans 14, and also to cancel out the rotary component imparted to these flows by the rotation of the blades of the fans, distribution and guide flaps 23 are located immediately downstream of these components in the delivery chamber X, these flaps being provided in the appropriate quantity and distributed over the height of this chamber. Each of these flaps 23 is fixed, for example, at one end to the shell 4 and at the other end to the wall 15, and the flaps 23 extend into the mouth 19 and are, for example, positioned horizontally in the intermediate area of this mouth, while at the ends or at least at one end of this mouth 19 they are suitably inclined, with respect to the direction of rotation of the blades of the fans 14, to prevent downward or upward leakage of the air and liquid flow leaving the said mouth 19.

Figure 12:
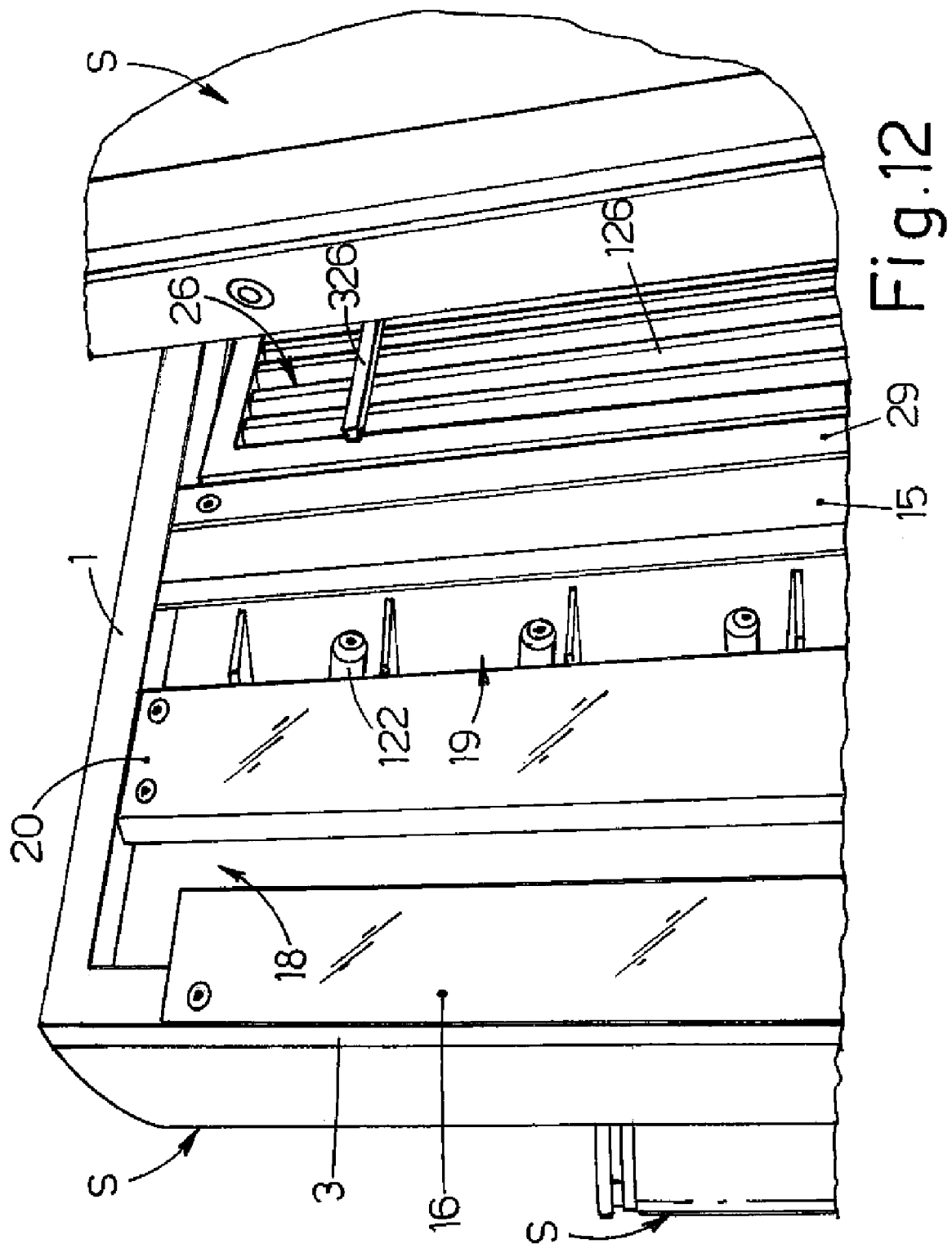
FIGS. 12 and 13 are perspective views of the upper and lower parts respectively of a single shield of the machine, viewed from the side which faces the row.
Figure 13:
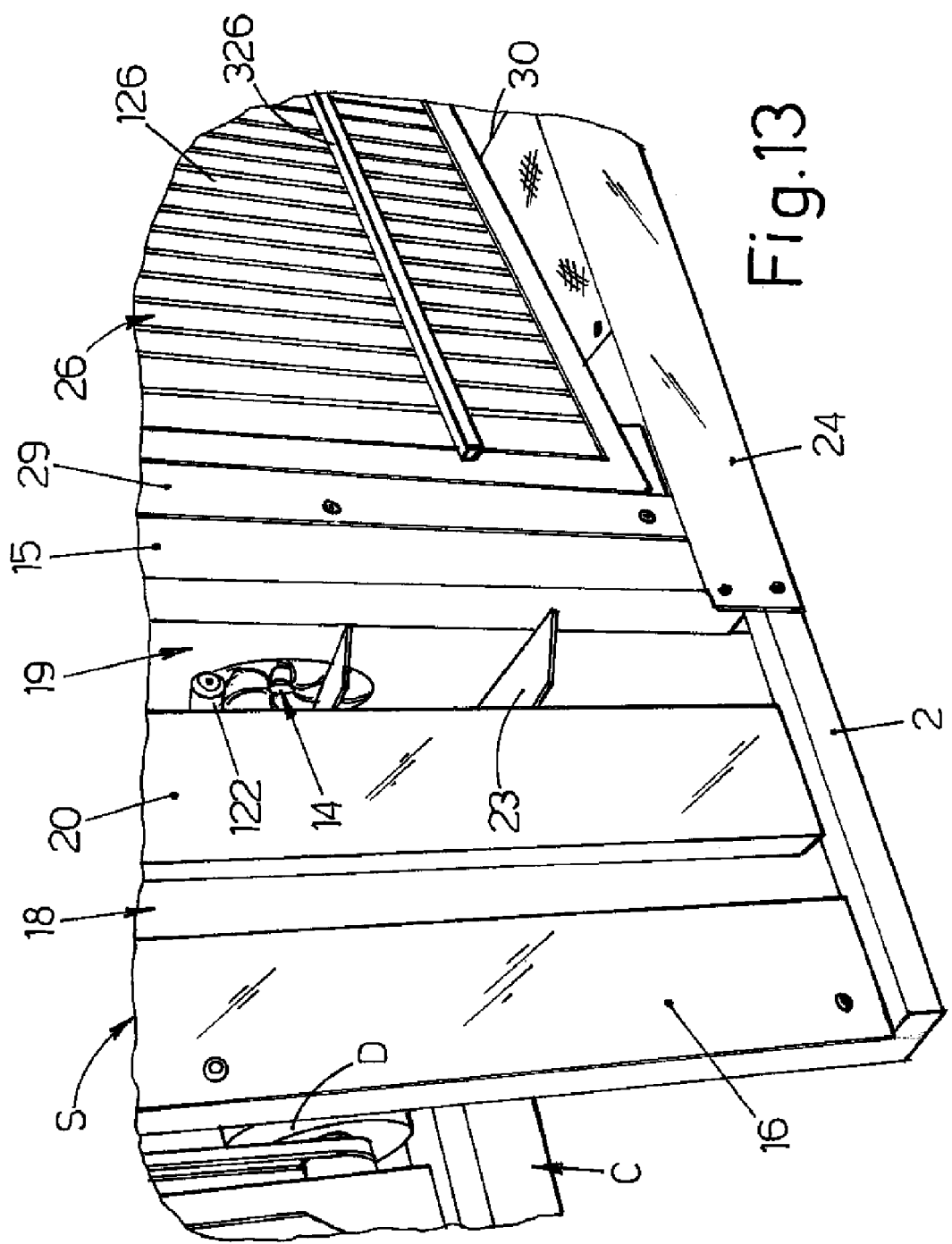
Figure 14:
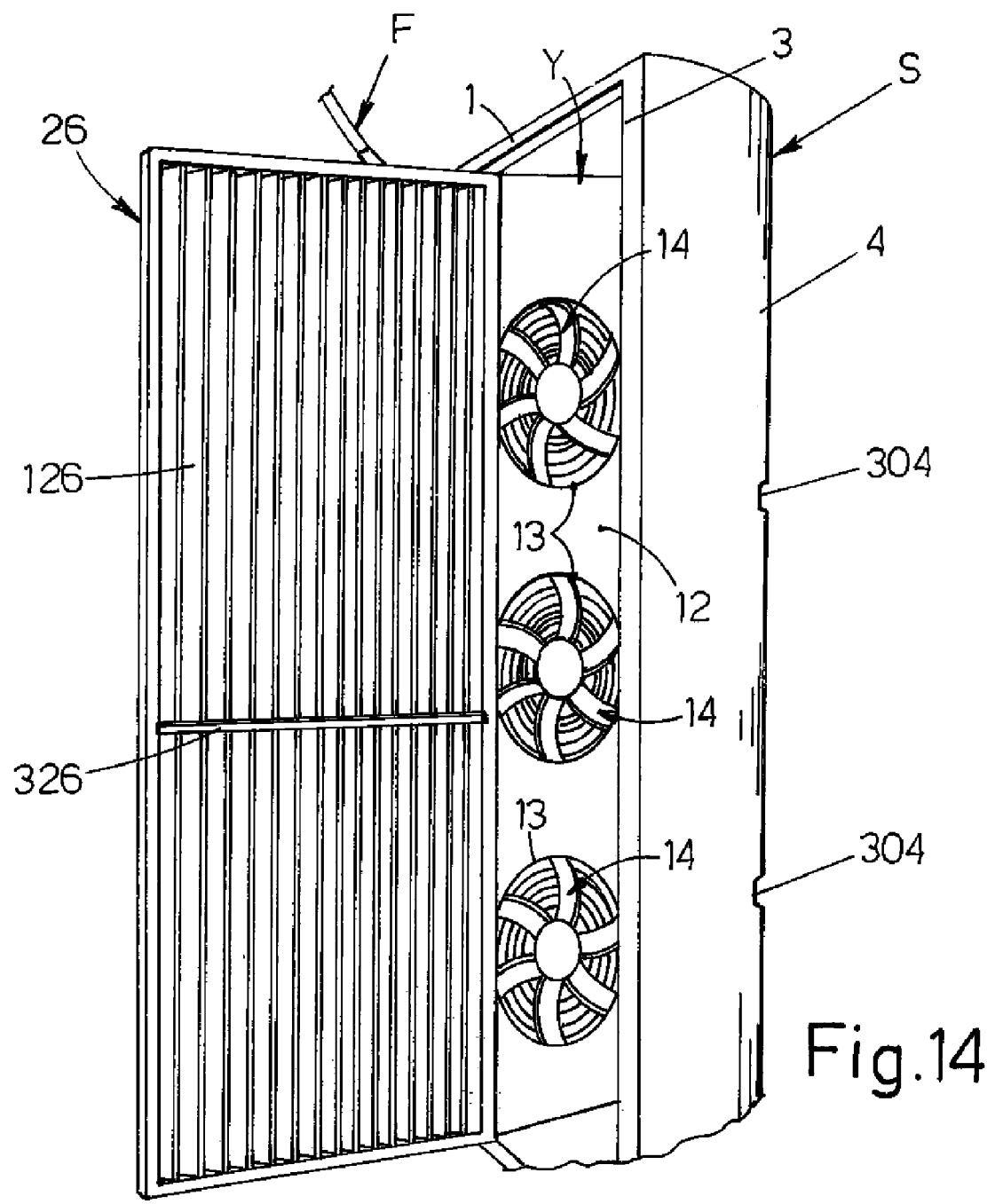
FIG. 14 shows the inside of the intake chamber of one shield, with the corresponding filter port in the open position.
Figure 15:
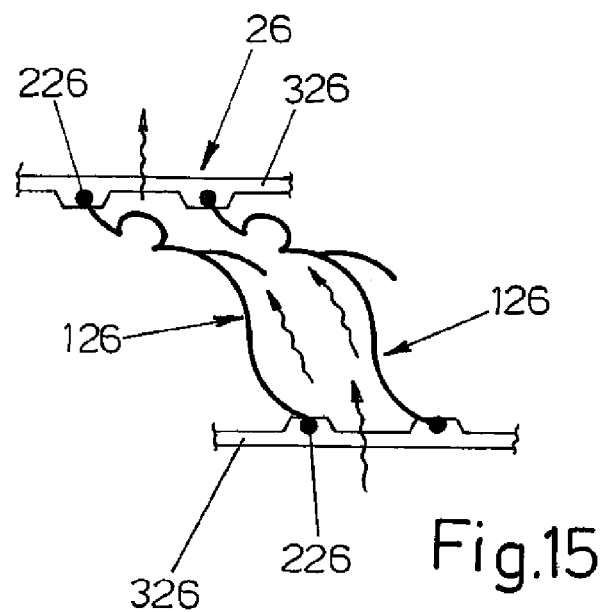
FIG. 15 shows the profile of the bars which form the slatted buffer of the filter port located on the intake chamber mouth of each shield.

As shown in FIGS. 3 and 4 and in FIG. 13, a small projecting horizontal wall 24 is fixed on edge, in a sealed way, on the lower side of the inner side of the intake chamber Y, from the vertical wall 15 to the opposing upright 3 of this chamber, and forms, in combination with the lower part of the shell 4 of the said chamber Y, a vessel for collecting the treatment liquid recovered from the shields by the suction of the electric fans 14. A vertical rod 25 whose ends are fixed to the bases 1 and 2 of the shield is provided in the corner area between the vertical wall 12 and the said horizontal containing wall 24, this rod being used as a fulcrum for the flaplike rotation of a hatch 26 which in the operating position is located with an appropriate inclination inside the intake chamber Y, as shown in FIGS. 3 and 4 and in FIGS. 8, 12 and 13, with its vertical side opposite the side engaged with the fulcrum 25 bearing on stops 27 and locked in this position by at least one intermediate catch 28. The hatch 26 is positioned above the upper edge of the said lower containing plate 24 (FIGS. 3 and 4) in such a way that, when the said catch 28 is released, the hatch can be rotated out of the chamber Y, as shown in FIGS. 14 and 16, to enable an operator to access the chamber Y for any necessary inspection and/or maintenance operation. The hatch 26 is designed to form a filter with a sufficiently close mesh to prevent the entry of foreign bodies into the chamber Y and to drain off the liquid component of the sprays sucked in by this chamber and formed during the treatment of the rows with the shielded machine in question, these sprays originating to a very small extent from the nozzles of the bar 22 of the shield of which the hatch 26 forms part, and partly from the nozzles of the spray bar of the shield located on the opposite side of the row. The hatch 26 is closed by at least one slatted buffer formed by a plurality of vertical bars 126 of suitable plastics material, having for example the irregular sinuous profile shown in FIG. 15, to capture and drain off the liquid portion of the sprays passing through them, these bars being positioned parallel to each other at equal intervals and with a suitable inclination with respect to the horizontal sides of the frame of the hatch 26 which have a grooved shape to house the ends of the bars in question. The ends 226 of the bars 126 are enlarged and fitted into complementary recesses of suitable supporting cross-pieces 326 of which, for example, two are provided with a symmetrical arrangement on the outer face of the hatch 26 (see FIGS. 12 and 13) and at least one is provided in the middle of the inner face of the hatch 26 (see FIGS. 14 and 16), and the ends of these cross-pieces are fixed to the uprights of the frame of the hatch 26. The lower horizontal side of the frame of the hatch 26 is provided with suitable apertures (not shown) to discharge to the base of the chamber Y all the liquid drained off by the filter formed by the bars 126. Clearly, as an alternative to the illustrated arrangement, the hatch 26 could be provided with a double buffer formed by two files of rods 126 suitably staggered with respect to each other and having, for example, opposing inclinations. In FIGS. 12 and 13, the number 29 indicates a strip of rubber which is fixed to the plate 15 to form a link between this plate and the adjacent vertical side of the frame of the hatch 26, to close the gap between the two parts, and has a lower end which drains into the base vessel of the intake chamber Y.

As an alternative to the arrangement shown in FIGS. 14 and 16 and in FIG. 3, a latticed protector similar to the device 114 mounted on the delivery ends of the fans can be provided on the ends of the fans 14 facing the chamber Y. On the base of the chamber Y, the shell 4 is provided with a recess which forms a well 30 closed with a degree of play by a lid 130 which may be latticed and which holds within the well a first filter 31 (FIG. 3) connected to the end of a pipe 32 which is connected through a secondary filter 33 to the intake aperture of an electric pump 34 which is fixed to the base of the chamber Y and is of the type used, for example, for safety in boats. The outlet of this pump is connected to the recycling pipe 35 which rises to the top of the shield S and which discharges the recovered liquid into the tanks Q of FIG. 1 through the bundle F (FIG. 2) formed additionally by the supply tube to the bar 22 and the electrical power cable for the fans 14. As an alternative to the illustrated arrangement, the inner lateral walls of the chamber Y can be roughened by a suitable painting treatment or by the application of suitable pads which may be removable, in order to increase the quantity of liquid recovered by filtration in the said intake chamber Y.

The electric pumps for recycling the liquid recovered from the bottom of the shields can be substituted by suction ducts connected to e membrane pump (not shown) analogous to the pump P which feeds the liquid to the spraying bars and arranged in line with said pump on the frame of the trailer C.

On one or both of the uprights 3 of each shield it is possible to mount hinged vertical flaps (not shown), pushed by springs against the row, which change their position by contact with parts of the row and which can provide all or some of the following functions: contributing to the formation of a more effective shield which retains the treatment fluid on the part of the row which is progressively treated by the machine; and forming, in combination with suitable proportional sensors, probes which enable the position of the shields S, S' to be corrected automatically by the operation of the actuators M1, M2 of the unit B shown in FIGS. 1 and 7, using simple automatic control systems of the type already used in other agricultural machines, for example in sugar beet harvesting machines, for aligning the harvesting arm with the row of plants.

Clearly, the dimensions and materials specified in the present description are mentioned purely for guidance and can be modified to adapt the machine to various operating requirements. Clearly, the invention can be modified in any minor ways which provide equal utility and which use the same innovative concept, without departure from the limits of protection of the present industrial model as described above, as illustrated and as claimed below. In the claims, the references in brackets are provided purely for guidance and do not limit the scope of protection of the said claims.

The invention claimed is:

1. A tunnel sprayer for rows of plants, the sprayer having opposing shields which substantially cover the whole heights of the opposing sides of at least one row, and which comprise fans to create a flow of air which in delivery travels parallel to a flow of treatment liquid sprayed on to each side of the row by at least one corresponding bar with nozzles and which in intake sucks in the air and treatment liquid delivered by the shield operating on the other side of the row, so as to avoid the dispersion due to wind drift and limit losses in the air and drips of excess liquid on to the ground,
wherein, in each shield an area of the mouth or mouths for the delivery of the pressurized fluid is suitably smaller than the sum of an area of the apertures occupied by the fans, in such a way that the delivery mouth or mouths give out corresponding air flows whose flow rates and pressures are uniformly distributed and substantially constant over a whole height of this delivery mouth or these delivery mouths, and wherein, in each shield there are two adjacent and parallel mouths for the delivery of pressurized air towards the row of plants, an inner mouth and an outer mouth, and in that at least one bar with the nozzles for spraying the plant treatment liquid is located in the inner mouth, in such a way that the outer delivery mouth also forms an effective protective barrier against drift phenomena caused by any presence of wind in the environment.

2. The sprayer according to claim 1, wherein the at least one bar with the nozz1es for spraying the plant treatment liquid is located on the side of the inner delivery mouth which is adjacent to the outer delivery mouth.

3. The sprayer according to claim 1, wherein the outer delivery mouth has a smaller horizontal width than the inner delivery mouth, in such a way that the air leaves this outer mouth with a pressure greater than that of the air leaving the inner mouth.

4. The sprayer according to claim 1, wherein the outer delivery mouth is designed to supply a pressurized flat air stream orientated towards the inside of the portion of the row progressively treated by the shield, in such a way as to promote, partly because of its higher pressure, the formation of a vortex in contact with the flat stream of air and liquid which leaves the inner delivery mouth, to improve the uniformity and depth of penetration of the wetting of the plants of the row.

5. The sprayer according to claim 1, wherein the fans comprise axial fans having a diameter of approximately 400 mm of which three are present on one shield, with an overall height of approximately 2150 mm, and characterized in that wherein the outer and inner delivery mouths have horizontal widths of approximately 60 mm and approximately 100 mm respectively, and in that these mouths are approximately 110 mm apart from each other.

6. The sprayer according to claim 5, wherein each shield has a horizontal extension or length of approximately 1250 mm.

7. The sprayer according to claim 5, wherein the axial fans are driven by sealed electric motors with a high degree of electrical insulation, positioned in a delivery chamber so as to be protected by a central disc from which blades of impellers of the axial fans radiate, suitable safety protection being provided upstream and/or downstream of the impellers.

8. The sprayer according to claim 7, wherein, for supplying the motors of the fans and other electrical users, the sprayer is provided with on-board electrical accumulators and one or more electrical generators which recharge the accumulators and which are driven, with the interposition of a suitable step-up gear, from the power take-off of the tractor towing the sprayer, which directly drives the high-pressure pump which supplies the treatment liquid to the bars with the nozzles.

9. The sprayer according to claim 1, wherein each shield has a shape in the form of an elongate semicircle in plan view, with the flat part facing the row, and is provided internally with an intermediate transverse wall in which are provided the apertures occupied by the fans, and the intermediate transverse wall divides an internal space of the shield into two chambers, of which a delivery chamber has a horizontal extension of approximately half or slightly less than half of that of an intake chamber.

10. The sprayer according to claim 9, wherein appropriately distributed full-height flaps, for distributing the air flows generated by the fans and for preventing the rotation of these flows, are provided immediately downstream of the fans in the delivery chamber, and the flaps extend to the inner delivery mouth and are mostly positioned horizontally, while at the lower and/or upper ends, depending on the direction of rotation of blades of the fans, the flaps are suitably inclined to prevent the flow of fluid discharged by the inner mouth from being dispersed outside the shield.

11. The sprayer according to claim 9, wherein at least one hatch is hinged in a flaplike way on the mouth of the intake chamber facing the row, with its fulcrum at the position of the intermediate wall incorporating the fans, the hatch being provided with at least one buffer formed by a plurality of vertical bars. having a suitable profile to create a slatted blind serving as a filter which prevents the entry of foreign bodies towards the fans and which acts as a barrier to drain off the liquid component of the sprays containing the plant treatment liquid supplied by the opposing shields of the machine, the lower side of the frame of the hatch being provided for this purpose with suitable apertures for discharging the liquid drained off by the bars of the hatch which in the active position is placed with its vertical side opposite the fulcrum side partially inside the intake chamber and bearing on stops against which the hatch is retained by at least one outer catch, the whole arrangement being such that, if necessary, this hatch can be opened outwards and enable an operator to access the intake chamber, for any necessary inspection and/or maintenance operations.

12. The sprayer according to claim 9, wherein, on the base of the intake chamber, there is provided a recess which forms a well closed by a pierced cover, which supports within the well a first filter connected to the end of a pipe which is connected through a secondary filter to the intake aperture of an electric pump fixed to the base of the chamber and having its outlet connected to a recycling pipe which rises to the top of the shield and which discharges the recovered liquid into the tanks of the machine through the bundle formed additionally by the supply tube to the bar with the nozzles and the electrical power cable for the fans.

13. The sprayer according to claim 9, wherein on a bottom of the suction chamber, there is provided a recess which forms a well closed by a latticed lid which holds within the well a first filter connected to an end of a pipe which is connected through a secondary filter to the intake aperture of a membrane pump which discharges recovered liquid into a reservoir.

14. The sprayer according to claim 1, wherein the shields are made with self-supporting characteristics, with a corresponding tubular steel section frame which supports a shell of plastics material and/or other impact-resistant material.

15. The sprayer according to claim 14, wherein the upper bases of the self-supporting shields are provided with suitable reinforcing cross-pieces which are fixed to the three-point attaching brackets mounted on the ends of corresponding end arm and intermediate arm, which are telescopically slidable into each other and, in a fixed section of a stationary arm, fixed to the vertical elevator unit, the end arm and intermediate arm being driven by corresponding jacks, of which one is external and drives the intermediate arm, while another jack is located inside this intermediate arm and drives the end arm, the outer end of the intermediate arm and the outer end of the fixed section being fitted with sliding means which comprise idle rollers, to facilitate the sliding of the end arm and the intermediate arm which with the passage of time tend to become soiled with the treatment material sprayed.

16. The sprayer according to claim 14, wherein the opposing shields comprise an inner shield and an outer shield, the inner shield being more visible to the driver of the tractor, has its upper bracket fixed to an intermediate arm, and the outer shield, has its upper bracket fixed to an end arm by means of a cylindrical hinge, with an axis parallel to the longitudinal axis of the end arm, and the outer shield is fixed to the end arm in such a way that its vertical median axis is behind the hinge, in such a way that, owing to the greater weight applied to this hinge, the outer shield tends to swing in the direction of advance of the machine, while the outer shield is held in the vertical position by its upper base which bears on a stop member fixed to the end arm.

17. The sprayer according to claim 16, wherein interaction between the stop member and the upper base of the outer shield can be achieved by interposing a damper which extends in a substantially unrestricted way if the outer shield encounters an obstacle which makes it rotate backwards, but which can suitably retard the opposite forward swing, by which the outer shield returns under the effect of gravity to the vertical position when it clears the obstacle.

18. The sprayer according to claim 14, wherein the shields with their support and movement structures are mounted in a front part, closest to wheels of a trailer provided at the front with a shaft for fixing to a tow hook of a tractor, so that the wheels are located immediately behind the shields, to facilitate the maneuvering of the machine when it is brought into or out of the rows, and the shields are placed in a position nearer the tractor and more visible to the driver, a reservoir of plant treatment liquid being mounted in a rear part of the trailer, while the front part of the trailer has mounted on it, in sequence, a high pressure hydraulic pump, which draws the treatment liquid from the reservoir to supply it to the spray bars and which is driven by a universal coupling moved by a power take-off of the tractor, another end of the shaft of the pump being used to transmit the motion to a step-up gear which is fixed with brackets to the trailer and which by means of a joint or a suitable transmission system drives one or more alternators designed to recharge a sufficient number of electrical accumulators required for correct operation of the machine, which are also housed with suitable protection on the trailer.

19. The sprayer according to claim 14, wherein, in order to limit rocking movements of the shields when the sprayer is in transit with the shields lowered and retracted lower bases of the shields near to a trailer can be connected structurally to the trailer with at least one corresponding telescopic or pantograph connection.

* * * * *